United States Patent

Cereghino et al.

[15] 3,639,778
[45] Feb. 1, 1972

[54] TESTING A SIGNAL VOTER
[72] Inventors: Bruce R. Cereghino, Thousand Oaks; Paul M. Rostek, Fountain Valley, both of Calif.
[73] Assignee: Lear Siegler, Inc.
[22] Filed: Mar. 26, 1970
[21] Appl. No.: 22,923

[52] U.S. Cl..............................307/204, 307/219, 307/235, 328/92, 324/57 A, 340/146.1
[51] Int. Cl. .................................H03k 19/00, G06f 11/08
[58] Field of Search ........................307/204, 219, 235, 211; 328/92, 120, 137, 149, 158, 188; 324/57 A, 57 PS; 340/146.1

[56] References Cited

UNITED STATES PATENTS 3,305,735  2/1967  Moreines................................307/204
3,025,508  3/1962  Merl et al...........................307/204 X
3,445,811  5/1969  Hashimoto et al.................307/204 X
3,538,498  11/1970  Games et al. .......................307/219 X Primary Examiner—John Zazworsky
Attorney—Christie, Parker & Hale

[57] ABSTRACT

A signal voter having a plurality of inputs and a single output is tested by applying to its inputs alternating current tracer signals that vary differently as a function of time. The resultant waveform formed at the output of the signal voter responsive to the tracer signals determines whether the voter is operating normally. In one embodiment, the resultant waveforms produced at the output of two voters responsive to the same tracer signals are compared with each other to determine whether the voter is operating normally. In another embodiment, a group of logic gates responsive to a square wave signal produces binary tracer signals that reproduce the square wave signal at the output of the voter in normal operation.

FIG_9

3,639,778

TESTING A SIGNAL VOTER

BACKGROUND OF THE INVENTION

This invention relates to electronic equipment testing and, more particularly, to a method and apparatus for testing a signal voter.

A signal voter is an electronic device that has a plurality of inputs and a single output. The voter transmits to its output the signal applied to one of its inputs, depending upon the relative amplitudes of such input signals. For example, a voter having three inputs, which is sometimes called a trivoter, would transmit to its output the input signal whose amplitude lies between the amplitudes of the remaining two input signals. A signal voter having four inputs, which is sometimes called a quadvoter, would transmit to its output the input signal whose amplitude is the second most positive of the four input signals or the second most negative of the four input signals. The total number of combinations of input signal conditions to which the signal voter must be capable of responding is related to the factorial of the number of inputs of the voter. Thus, a trivoter responds to six different combinations and a quadvoter responds to 24 different combinations.

The normal testing procedure for a signal voter is a laborious task. Input signals simulating each combination of input conditions are in turn applied to the inputs of the signal voter and the output of the signal voter is monitored for the proper response. Accordingly, the checkout of a quadvoter requires 24 separate steps, each involving the application of a different combination of test signals to the voter inputs.

One common application for signal voters is fail-operational redundant control systems, such as automatic flight control systems for aircraft. For example, in an automatic flight control system, a signal voter selects the most suitable of three or four computed command signals for application to a servomechanism that controls an aircraft control surface. Automatic flight control systems for commercial aircraft demand a very high degree of reliability and safety. Therefore, it is desirable to provide a signal voter in such a control system with an in-flight self-testing capability. Unfortunately, this is highly impractical with the normal testing procedure outlined in the preceding paragraph.

SUMMARY OF THE INVENTION

The invention involves the testing of a signal voter by applying to its respective inputs alternating current tracer signals that vary differently from one another as a function of time. In normal operation, the tracer signals produce at the voter output a particular resultant signal waveform. The voter output is monitored for the particular resultant waveform. When the actual resultant waveform at the voter output deviates from the particular resultant waveform, a malfunction is indicated. The invention achieves a high percentage of error detection without requiring a plurality of separate testing steps corresponding to the different input conditions of the voter. In fact, only a single testing step is required in the sense that a single tracer signal is applied to each voter input for the duration of the test.

As a result of this feature, the invention is easily adaptable for self-testing a signal voter during its actual operation in a redundant control system. The tracer signals are all at frequencies above the frequency range of the input command signals to be selected, so the tracer pattern can be separated from the selected command signal by appropriate filtering.

One technique of monitoring the resultant tracer pattern waveform appearing at the output of a signal voter is to compare the resultant waveform with the resultant waveform at the output of another identical signal voter to the respective inputs of which the same tracer signals are applied. When a comparison reveals a lack of correspondence between the resultant waveforms at the two voter outputs, a malfunction in one of the voters is indicated and an appropriate alarm is given.

Another technique of monitoring the resultant waveform appearing at the output of a signal voter is to choose the tracer signals so in normal operation they produce at the voter output an easily detectable waveform, such as a square wave. Preferably the tracer signals are generated by groups of logic gates that operate in response to a square wave signal. The tracer signals, which are all at the same submultiple of the square wave signal, change between two binary values at different points each testing cycle, depending upon the truth table of the signal voter. In normal operation, the tracer signals combine to reproduce the square wave signal at the voter output. When the resultant waveform at the voter output deviates from a square wave, a malfunction is indicated.

In testing a quadvoter in accordance with the invention, it is particularly advantageous to implement the quadvoter with a truth table that selects the second most positive signal for half the input signal conditions and the second most negative input signal for half the input signal conditions. Such a symmetrical truth table permits tracer signals that normally produce a square wave resultant waveform at the voter output to test all the input conditions with a high percentage of failure detection.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENTS

Figure 9:
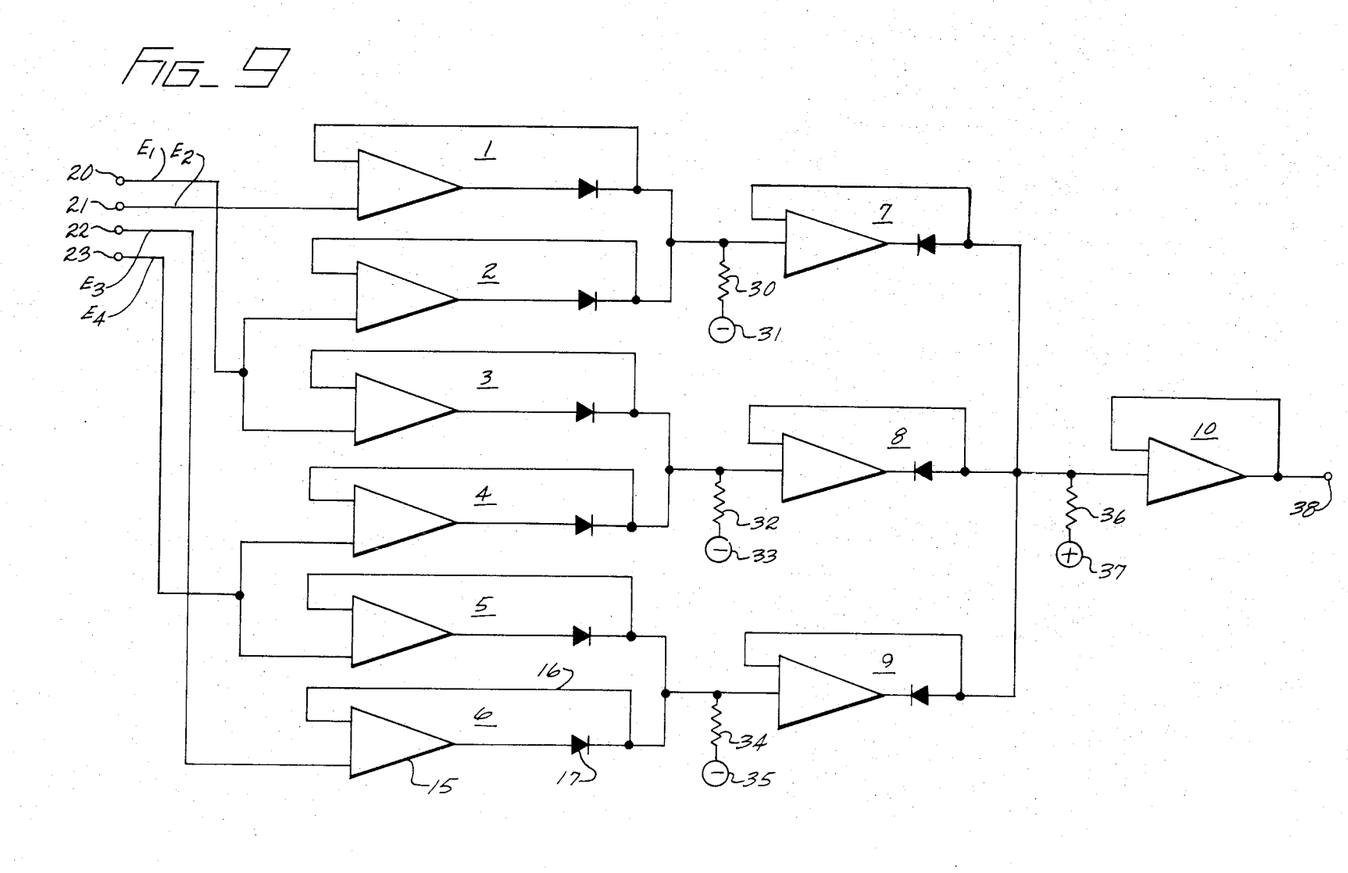
FIG. 9 is a circuit schematic diagram of the quadvoter under test in FIGS. 1 and 2.

Reference is first made to FIG. 9 for a description of a preferred embodiment of the quadvoter tested according to the principles of the invention. The quadvoter comprises three tandem stages of operational amplifiers. The first stage comprises operational amplifiers 1, 2, 3, 4, 5 and 6; the second stage comprises operational amplifiers 7, 8 and 9; and the third stage comprises an operational amplifier 10. The operational amplifiers each comprise a high gain amplifier, such as that designated 15, and a feedback connection, such as that designated 16, coupling the amplifier output to its input. Operational amplifiers 1 through 9 also have a diode such as that designated 17 connected between the output of the high gain amplifier and the feedback connection. In the case of the first stage, the diode is poled with its anode at the output of the high gain amplifier, and in the case of the second stage the diode is poled with its cathode at the output of the high gain amplifier. The operational amplifiers function in conventional fashion to reproduce at their respective outputs the signal appearing at their respective inputs so long as the associated diode is not back-biased.

The quadvoter has input terminals 20, 21, 22, and 23 to which the signals to be selected, designated $E_1$, $E_2$, $E_3$, $E_4$, are respectively applied. Input terminal 21 is connected to the input of operational amplifier 1; input terminal 20 is connected to the inputs of operational amplifiers 2 and 3; input terminal 23 is connected to the inputs of operational amplifiers 4 and 5; and input terminal 22 is connected to the input of operational amplifier 6. The outputs of operational amplifiers 1 and 2 are connected together to selectively transmit the more positive of signals $E_1$ and $E_2$. The more positive of these two signals, appearing at the common output of operational amplifiers 1 and 2, back-biases the operational amplifier to which the less positive of the two signals is applied. Similarly, the outputs of operational amplifiers 3 and 4 are connected together to selectively transmit the more positive of signals $E_1$ and $E_4$, and the outputs of operational amplifiers 5 and 6 are connected together to selectively transmit the more positive of input signals $E_3$ and $E_4$. In short, the first stage of operational amplifiers selects the more positive of three different pairs of the four input signals to be selected.

The common output of operational amplifiers 1 and 2 is coupled to the input of operational amplifier 7 and through a resistor 30 to a source 31 of negative potential; the common output of operational amplifiers 3 and 4 is connected to the input of operational amplifier 8 and through a resistor 32 to a source 33 of negative potential; and the common output of operational amplifiers 5 and 6 is connected to the input of operational amplifier 9 and through a resistor 34 to a source 35 of negative potential. Sources 31, 33 and 35 provide equal biases to the inputs of operational amplifiers 7, 8 and 9 respectively. The outputs of operational amplifiers 7, 8 and 9 are all connected together to selectively transmit the most negative of the signals applied to their inputs. The diodes corresponding to the operational amplifiers to which the two more positive input signals are applied are back-biased by the most negative input signal. In short, the second operational amplifier stage selects the most negative signal from the three more positive signals selected by the first stage.

The common output of operational amplifiers 7, 8 and 9 is connected to the input of operational amplifier 10 and through a resistor 36 to a source 37 of positive potential. Amplifier 10 serves as a buffer stage to transmit to an output terminal 38 the signal appearing at the common output of operational amplifiers 7, 8 and 9.

The quadvoter shown in FIG. 9 satisfies the following truth table wherein the individual vertical columns represent the 24 possible different combinations of input signal conditions.

QUAD VOTER TRUTH TABLE

| 1 | 1 | 3 | 3 | 1 | 1 | 2 | 2 | 1 | 1 | 4 | 4 | 3 | 3 | 4 | 4 | 2 | 2 | 4 | 4 | 2 | 2 | 3 | 3 |
|---|---|---|---|---|---|---|---|---|---|---|---|---|---|---|---|---|---|---|---|---|---|---|---|
| 3 | 3 | 1 | 1 | 2 | 2 | 1 | 1 | 4 | 4 | 1 | 1 | 4 | 4 | 3 | 3 | 4 | 4 | 2 | 2 | 3 | 3 | 2 | 2 |
| 2 | 4 | 2 | 4 | 3 | 4 | 3 | 4 | 2 | 3 | 2 | 3 | 1 | 2 | 1 | 2 | 1 | 3 | 1 | 3 | 1 | 4 | 1 | 4 |
| 4 | 2 | 4 | 2 | 4 | 3 | 4 | 3 | 3 | 2 | 3 | 2 | 2 | 1 | 2 | 1 | 3 | 1 | 3 | 1 | 4 | 1 | 4 | 1 |

In the above truth table, the numbers represent the subscripts of the input signals $E_1$, $E_2$, $E_3$, and $E_4$; the input signals are arranged vertically in order of relative amplitude so the topmost number of each vertical column represents the most positive of the four input signals and the bottommost number of each vertical column represents the most negative of the four input signals; and the number inside of the heavy-lined square of each vertical column represents the input signal that is selectively transmitted by the quadvoter for the stated combination of input signal conditions. For example, the extreme left-hand vertical column of the truth table represents the combination of input signal conditions in which signal $E_1$ is larger than signal $E_3$, signal $E_3$ is larger than signal $E_2$, and signal $E_2$ is larger than signal $E_4$. In such case, signal $E_3$ is selectively transmitted by the quadvoter. The extreme right-hand vertical column of the truth table represents the combination of input signal conditions in which signal $E_3$ is larger than signal $E_2$, signal $E_2$ is larger than signal $E_4$, and signal $E_4$ is larger than signal $E_1$. In such case, signal $E_4$ is selectively transmitted. It is to be noted that in twelve of the different combinations of input conditions, the second most positive signal is selected, and in twelve combinations thereof, the second most negative signal is selected. As explained in detail below, it is of particular advantage to use a quadvoter having such a symmetrical truth table to practice the invention.

Figure 1:
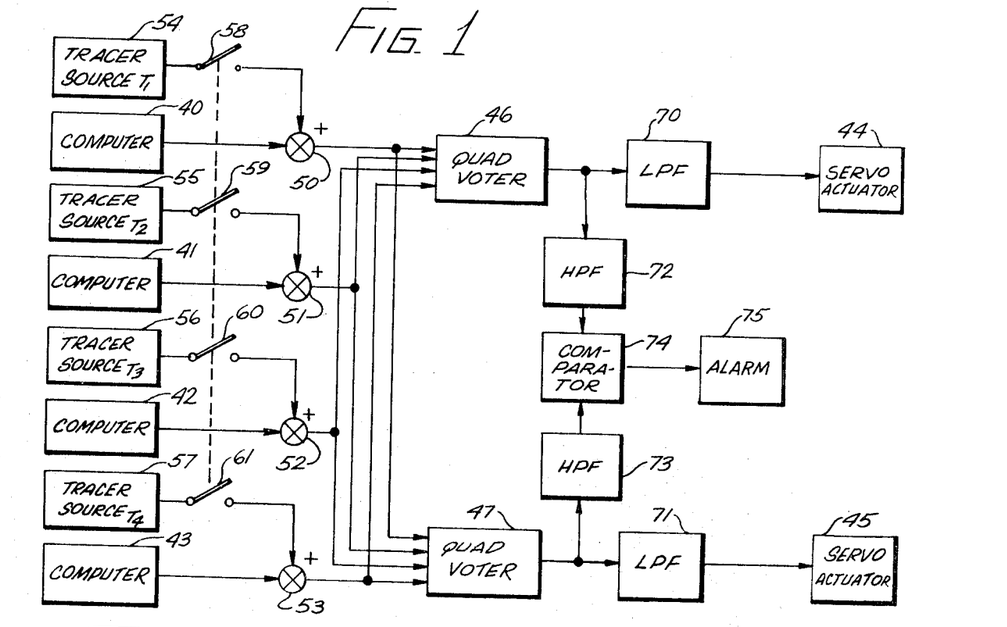
FIG. 1 is a block schematic diagram of one embodiment of the invention.

Reference is now made to FIG. 1 for an exemplary embodiment of the invention. Computers 40, 41, 42, and 43 produce nominally identical command signals to drive servo actuators 44 and 45. Servo actuators 44 and 45 could drive the control surface of an aircraft. In a typical application, computers 40 through 43 could be the pitch axis computers of an automatic flight control system that compute a pitch axis command signal responsive to aircraft sensors. Although nominally identical, the command signals generated by computers 40 through 43 in practice differ somewhat from each other due to component tolerances and possible equipment failures that may occur. The outputs of computers 40, 41, 42, and 43 are coupled through summing junctions 50, 51, 52, and 53, respectively, to the different inputs of quadvoters 46 and 47. Tracer sources 54, 55, 56, and 57 are coupled through ganged switches 58, 59, 60, and 61, respectively, to summing junctions 50, 51, 52, and 53, respectively. Sources 54, 55, 56, and 57 generate tracers $T_1$, $T_2$, $T_3$, and $T_4$, respectively, which are alternating current signals that vary differently as a function of time. For example, tracers $T_1$ through $T_4$ could all have different frequencies, different phase shifts at the same frequency, and/or different waveforms (e.g., sawtooth, square, or sinusoidal) at the same frequency. In any case, tracers $T_1$ through $T_4$ are so chosen to produce a tracer pattern at the outputs of quadvoters 46 and 47 that in normal operation lies wholly within a frequency band that is higher than the frequency band of the command signals generated by computers 40 through 43. Further, it is assumed that the amplitude differences of tracers $T_1$ through $T_4$ are much greater than the amplitude differences of the command signals, total failures of the command signals being excluded from the quadvoters by an arrangement of comparators and switches not part of the invention. When switches 58 through 61 are closed, tracers $T_1$, $T_2$, $T_3$, and $T_4$ are additively Combined with the command signals generated by computers 40, 41, 42, and 43, respectively. Thus, quadvoters 46 and 47 selectively transmit the command signals with the tracers superimposed upon them. In accordance with the above truth table, the sum of one of the command signals and its associated tracer is transmitted by quadvoters 46 and 47. The tracer signals are so selected that they periodically duplicate each of the 24 combinations of input signal conditions represented in the truth table. Thus, the quadvoters are forced by the tracer signals continuously and periodically to selectively transmit different input signals, thereby self-testing their performance. In normal operation, quadvoters 46 and 47 select the same command signal for transmission. The output of quadvoter 46 is coupled by a low-pass filter 70 to servo actuator 44 and the output of quadvoter 47 is coupled by a low-pass filter 71 to servo actuator 45. The outputs of quadvoters 46 and 47 are also coupled through high-pass filters 72 and 73, respectively, to the inputs of a comparator 74. Filters 70 through 73 serve to separate the tracer resultant waveform from the command signals and vice versa at the outputs of quadvoters 46 and 47. The cutoff frequency of low-pass filters 70 and 71 lies between the frequency band of the tracer pattern and the frequency band occupied by the command signals so as to selectively transmit to servo actuators 44 and 45 only the command signals. Similarly, the cutoff frequency of high-pass filters 72 and 73 also lies between the frequency band of the tracer pattern and frequency band of the command signals so as to selectively transmit to comparator 74 only the tracer signals. When comparator 74 senses a disparity in the resultant waveform of the tracer signals applied to its inputs, it actuates an alarm 75. Thus, under the specified circumstances the arrangement of FIG. 1 permits quadvoters 46 and 47 to be tested while in operation without disturbing the normal command signal selecting function they perform. Under other circumstances, quadvoters 46 and 47 can be tested by applying tracer signals $T_1$ through $T_4$ to their inputs in the absence of command signals.

Figure 2:
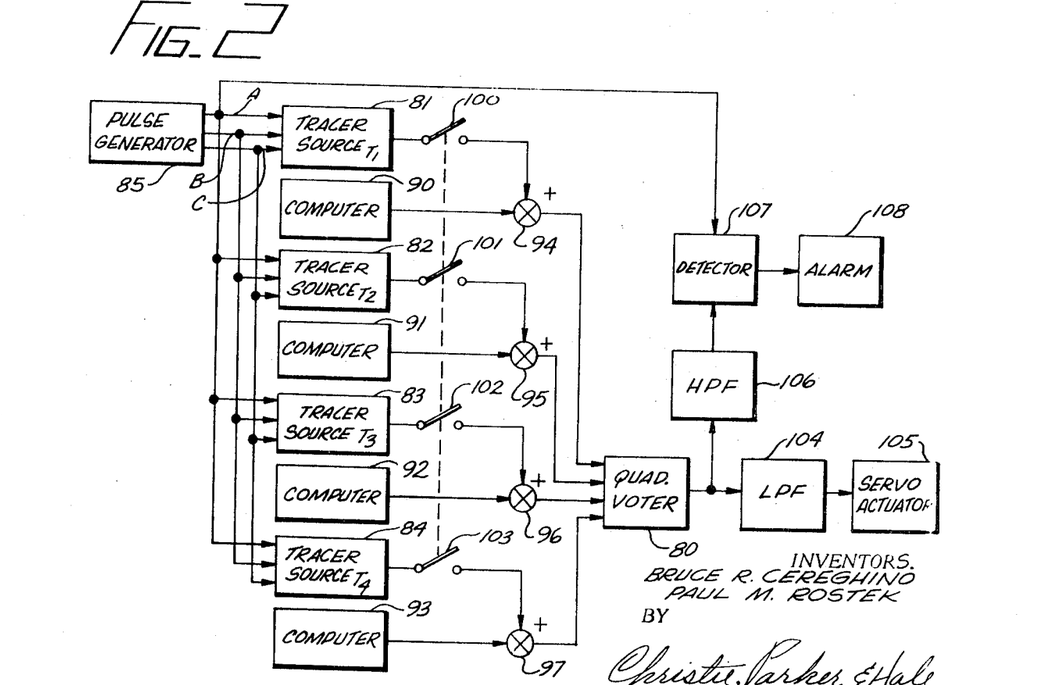
FIG. 2 is a block schematic diagram of another embodiment of the invention.

FIG. 2 discloses an arrangement involving a single quadvoter 80 and tracer sources 81, 82, 83, and 84 that produce at the output of quadvoter 80, in normal operation, a particular, easily detectable tracer resultant waveform, i.e., a square wave. As used in this specification, the term "square wave" means a binary signal that changes state in each direction at equal intervals of time, i.e., a symmetrical binary signal. Tracer sources 81 through 84 are controlled by a pulse generator 85 that has output leads A, B, and C coupled to each of tracer sources 81 through 84. Computers 90, 91, 92, and 93 generate nominally identical command signals that are coupled through summing junctions 94, 95, 96, and 97, respectively, to the inputs of quadvoter 80. The outputs of sources 81, 82, 83, and 84 are coupled through ganged switches 100, 101, 102, and 103, respectively, to summing junctions 94, 95, 96, and 97, respectively, where the tracer signals are additively combined with their respective command signals. The output of quadvoter 80 is coupled by a low-pass filter 104 to a servo actuator 105 and by a high-pass filter 106 to a waveform detector 107. Detector 107 actuates an alarm 108 when the particular resultant waveform fails to appear at the output of high-pass filter 106. The exact nature of detector 107 depends upon the nature of the resultant waveform produced at the output of quadvoter 80. For the purpose of illustration, detector 107 is assumed to be a comparator that compares the signal at the output of high-pass filter 106 with the signal on output lead A of pulse generator 85, which is coupled to detector 107. In some cases, detector 107 could monitor the resultant waveform directly without an external reference signal. For example, it could compare the duration of the opposite binary states and actuate alarm 108 whenever the duration of successive states differs. Alternatively, in a checkout test, detector 107 could be an oscilloscope that is observed by a human. The deterioration of the square wave on the face of the scope indicates a malfunction.

Reference is now made to FIGS. 3 through 8 for an exemplary implementation of tracer sources 81 through 84 and pulse generator 85 that produces a square wave resultant waveform at the output of quadvoter 80 in normal operation. It is to be understood that other implementations could also be employed to achieve a normal square wave tracer pattern and that other types of easily detectable tracer patterns could be employed instead of a square wave. For the purpose of discussion, it is assumed that the two binary states involved are a given negative potential and a given positive potential. The output of each flip-flop represented in FIG. 3 changes binary states each time the binary signal applied to its input changes from the positive to the negative potential. The output of each inverter represented in FIGS. 4 through 7 is at the positive potential when the binary signal applied to its input is at the negative potential and vice versa. The output of each NAND circuit represented in FIGS. 3 through 7 is at the negative potential when the binary signals applied to its inputs are both at the positive potential; otherwise, the output of each NAND circuit is at the positive potential.

Figure 3:
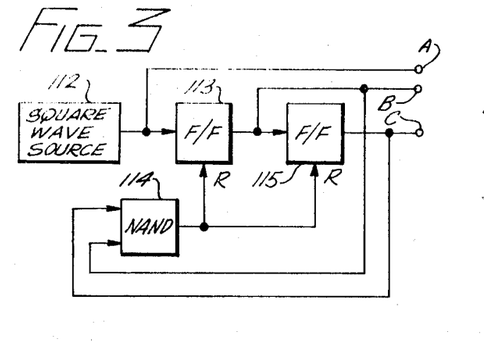
FIG. 3 is a block schematic diagram of the pulse generator of FIG. 2.
Figure 8:
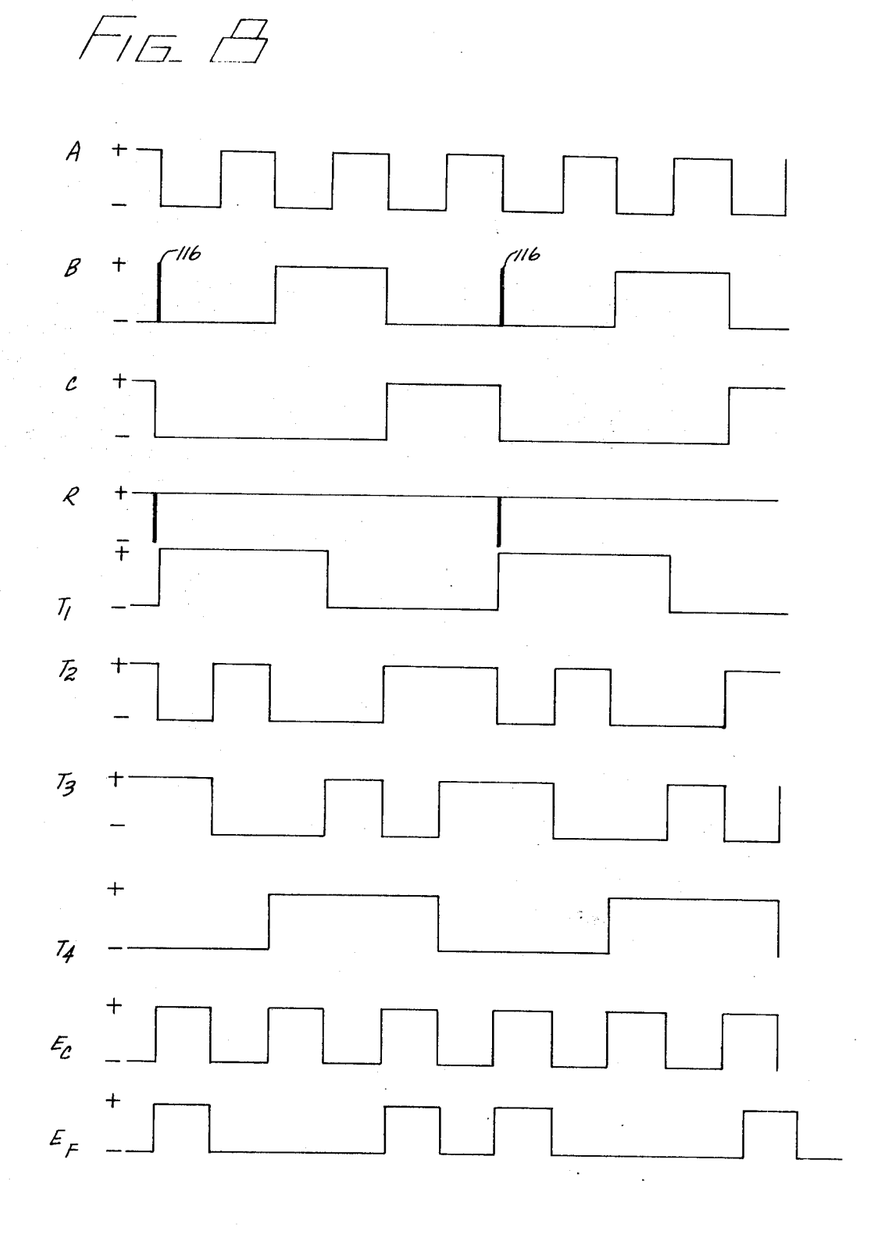
FIG. 8 is a diagram depicting the waveforms involved in the embodiment of FIGS. 2 through 7.

In FIG. 3, which shows pulse generator 85, the output of a square wave source 112, which is represented in FIG. 8 by waveform A, is coupled to output lead A and to the input of a flip-flop 113. The output of flip-flop 113, which is depicted in FIG. 8 by waveform B, is coupled to output lead B, to one input of NAND-circuit 114, and to the input of a flip-flop 115. The output of flip-flop 115, which is depicted in FIG. 8 by waveform C, is coupled to output lead C and to the other input of NAND-circuit 114. The output of NAND-circuit 114, which is depicted in FIG. 8 by waveform R, is coupled to the reset inputs of flip-flops 113 and 115. As a result, each time that the binary signal at the output of NAND-circuit 114 changes from the negative to the positive potential, flip-flops 113 and 115 are reset so their outputs assume the negative potential. The binary signal at the output of flip-flop 113 changes states at a frequency one-half that of the square wave from source 112. As depicted at 116 in waveform B, every other time that the signal at the output of flip-flop 113 assumes the positive potential, it immediately returns to the negative potential responsive to a reset pulse that is generated at the output of NAND-gate 114 by the concurrent assumption of the positive potential by flip-flops 113 and 115. These reset pulses also cause the output of flip-flop 115 to return prematurely to the negative potential. Thus, the signals produced at the outputs of flip-flops 113 and 115 repeat at a submultiple, i.e., one-third, of the frequency of the square wave produced by source 112.

Figure 4:
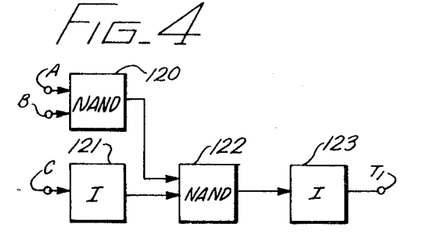
FIGS. 4 through 7 are block schematic diagrams of the tracer sources of FIG. 2.

In FIG. 4, which shows tracer source $T_1$, output leads A and B from pulse generator 85 are coupled to the inputs of a NAND-circuit 120 and output lead C is coupled to the input of an inverter 121. The outputs of NAND-circuit 120 and inverter 121 are connected to the inputs of a NAND-circuit 122. The output of NAND-circuit 122 is coupled through an inverter 123 to an output lead $T_1$. The binary signal appearing on output lead $T_1$, which is depicted in FIG. 8 by waveform $T_1$, is coupled to summing junction 94 (see FIG. 2).

Figure 5:
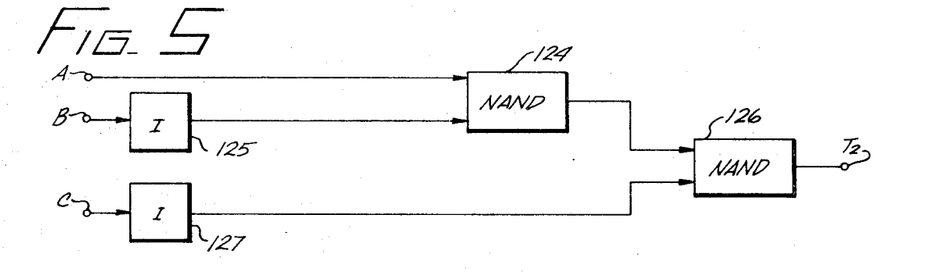

In FIG. 5, which shows tracer source 82, output lead A of pulse generator 85 is directly coupled to one input of a NAND-circuit 124 and output lead B is coupled through an inverter 125 to the other input of NAND-circuit 124. The output of circuit 124 is connected to one input of a NAND-circuit 126 and output lead C from pulse generator 85 is coupled through an inverter 127 to the other input of NAND-circuit 126. The output signal from NAND-circuit 126, which is depicted in FIG. 8 by waveform $T_2$, is coupled by an output lead $T_2$ to summing junction 95 (see FIG. 2).

Figure 6:
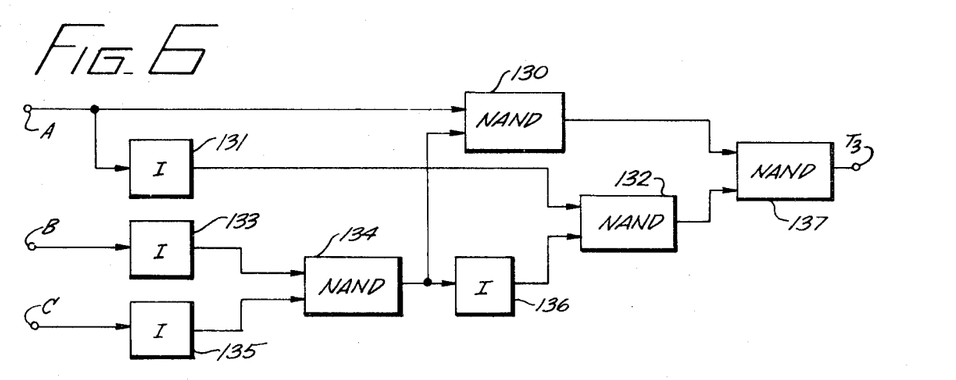

In FIG. 6, which shows tracer source 83, output terminal A of pulse generator 85 is coupled directly to one input of a NAND-circuit 130 and through an inverter 131 to one input of a NAND-circuit 132. Output lead B of pulse generator 85 is coupled through an inverter 133 to one input of a NAND-circuit 134. Output lead C of pulse generator 85 is coupled through inverter 135 to the other input of NAND-circuit 134. The output of NAND-circuit 134 is directly connected to the other input of NAND-circuit 130 and is connected through an inverter 136 to the other input of NAND-circuit 132. The outputs of NAND-circuits 130 and 132 are coupled to the inputs of a NAND-circuit 137. The output signal from NAND-circuit 137, which is depicted in FIG. 8 by waveform $T_3$, is coupled by an output lead $T_3$ to summing junction 96.

Figure 7:
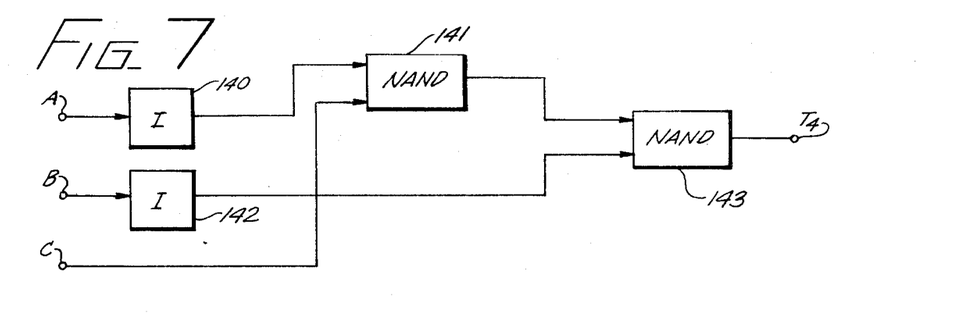

In FIG. 7, which shows tracer source 84, output lead A of pulse generator 85 is coupled through an inverter 140 to one input of a NAND-circuit 141. Output lead C is directly coupled to the other input of NAND-circuit 141. The output of NAND-circuit 141 is directly connected to one input of a NAND-circuit 143. Output lead B of pulse generator 85 is coupled through an inverter 142 to the other input of NAND-circuit 143. The output signal from NAND-circuit 143, which is depicted in FIG. 8 by waveform $T_4$, is coupled by an output lead $T_4$ to summing junction 97.

As verified by the above quadvoter truth table, the application of tracer signals identical to waveforms $T_1$ through $T_4$ in FIG. 8 to the respective inputs of the quadvoter of FIG. 9, produces in normal operation a square wave resultant waveform at its output, as depicted in FIG. 8 by waveform $E_c$, which is identical to the waveform of source 112, as depicted by waveform A. When the quadvoter fails to function in accordance with the above truth table, i.e., when a malfunction in the quadvoter occurs, the square wave resultant waveform deteriorates, leaving gaps between the pulses. A typical resultant waveform that occurs during a malfunction is depicted in FIG. 8 by waveform $E_f$. Waveforms $T_1$ through $T_4$ all occur at a frequency that is one-third the frequency of waveforms A and $E_c$.

The above quadvoter truth table is repeated below in vertical juxtaposition with a tracer truth table developed from waveforms $T_1$ through $T_4$ in FIG. 8.

TRACER TRUTH TABLE

|    | A₁ | B₁ | A₂ | B₂ | A₃ | B₃ |
|----|----|----|----|----|----|----|
| T₁ | 1  | 1  | 1  | 0  | 0  | 0  |
| T₂ | 0  | 1  | 0  | 0  | 1  | 1  |
| T₃ | 1  | 0  | 0  | 1  | 0  | 1  |
| T₄ | 0  | 0  | 1  | 1  | 1  | 0  |

QUAD VOTER TRUTH TABLE

| + | | | | | | | | | | | | | | | | | | | | | | | | |
|---|---|---|---|---|---|---|---|---|---|---|---|---|---|---|---|---|---|---|---|---|---|---|---|---|
| 1 | 1 | 3 | 3 | 1 | 1 | 2 | 2 | 1 | 1 | 4 | 4 | 3 | 3 | 4 | 4 | 2 | 2 | 4 | 4 | 2 | 2 | 3 | 3 |
| 3 | 3 | 1 | 1 | 2 | 2 | 1 | 1 | 4 | 4 | 1 | 1 | 4 | 4 | 3 | 3 | 4 | 4 | 2 | 2 | 3 | 3 | 2 | 2 |
| 2 | 4 | 2 | 4 | 3 | 4 | 3 | 4 | 2 | 3 | 2 | 3 | 1 | 2 | 1 | 2 | 1 | 3 | 1 | 3 | 1 | 4 | 1 | 4 |
| 4 | 2 | 4 | 2 | 4 | 3 | 4 | 3 | 3 | 2 | 3 | 2 | 2 | 1 | 2 | 1 | 3 | 1 | 3 | 1 | 4 | 1 | 4 | 1 |
| − | | | | | | | | | | | | | | | | | | | | | | | | |

In the above tracer truth table, the number "1" designates the positive potential and the number "0" designates the negative potential; the horizontal rows $T_1$ through $T_4$ designate the binary values of the different tracer signals $T_1$ through $T_4$; and the vertical columns $A_1$, $B_1$, $A_2$, $B_2$, $A_3$, $B_3$ designate the different time intervals between changes of state of waveform A. Four different combinations of quadvoter signal input conditions are grouped in the quadvoter truth table under each vertical column of the tracer truth table to signify that these four quadvoter input conditions are checked by the tracer signals $T_1$ through $T_4$ during the time interval corresponding to such vertical column.

It is to be noted that the number of combinations of input signal conditions in which the second most positive voter input signal is transmitted equals the number of combinations in which the second most negative voter input signal is transmitted and that in successive groups of four combinations there is alternation between transmission of the second most positive and the second most negative voter input signal. Thus, in the extreme left-hand column of the truth tables, where the quadvoter selects the second most positive input signal, the voter output signal has a positive potential representative of tracer signal $T_1$ or $T_3$; in the second column from the left of the truth table, where the quadvoter selects the second most negative of the input signals, the voter output signal has a negative potential representative of tracer signal $T_3$ or $T_4$; in the third column from the left of the truth table, where the quadvoter selects the second most positive of the input signals, the voter output signal has a positive potential representative of tracer signal $T_1$ or $T_4$; and similarly, in the remaining vertical columns of the truth tables moving from left to right, the quadvoter output signal alternates between the positive potential and the negative potential so as to produce, in normal operation, a square wave tracer pattern. By arranging the quadvoter truth table symmetrically in the above-depicted manner with respect to the tracer signal truth table, all the different input conditions can be tested by the presence or absence of a square wave tracer pattern at the quadvoter output. Indeed, in practice, 92 percent of all the failures that occur in the quadvoter have been detected by the deterioration of the square wave tracer pattern at the quadvoter output.

This symmetrical truth table is in contrast to the conventional quadvoter truth table in which the second most positive signal (or the second most negative signal) is selected for all but four of the combinations of input signal conditions and in the four remaining combinations the second most negative (or the second most positive) input signal is selected. The deviation for the four combinations of input signal conditions is made in order to prevent the selective transmission of an input signal computed responsive to a hard-over failure in one of three sensors from which the four input signals are computed. Accordingly, the modification of the quadvoter truth table to add eight more combinations to the original four, thereby achieving symmetry, is an important feature of the invention because it facilitates testing.

In addition to the particular set of tracer signals $T_1$ through $T_4$ shown in FIG. 8 and in the above tracer signal truth table, there are eight other different sets of tracer signals that would work equally well to check out all 24 different voter input signal conditions by the presence or absence of a square wave tracer resultant waveform. The different sets of tracer signals can be determined by exchanging vertical columns $A_1$, $A_2$, and/or $A_3$ and exchanging vertical columns $B_1$, $B_2$, and/or $B_3$. For example, vertical column $A_1$ could be exchanged with vertical column $A_2$. Nine such positional combinations of columns $A_1$, $A_2$, and $A_3$, and columns $B_1$, $B_2$, and $B_3$ exist, each defining a different set of suitable tracer signals.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, binary tracer signals that produce other types of tracer patterns can be employed instead of a square wave. Further, in some cases analog tracer signals, such as sine waves having the same or different frequencies could be employed. In any case, the tracer signals vary differently as a function of time so that all the voter input signal conditions are tested as the tracer signals vary.

We claim:

1. A self-testing signal selecting arrangement comprising:
    a signal voter having a plurality of inputs and a single output, the voter transmitting to the output the signal applied to one of its inputs, depending upon the relative amplitudes of such input signals;
    a plurality of sources of alternating current tracer signals that vary differently as a function of time, one source corresponding to each input of the signal voter, the tracer signals having the same period and different waveforms that produce at the output of the signal voter under normal operation a predetermined resultant tracer waveform that is repeated at a multiple of the frequency of the tracer signals;
    means for coupling each source to a different input of the signal voter; and
    means for generating an indication upon the absence of the predetermined resultant tracer waveform at the output of the signal voter.

2. The arrangement of claim 1, in which the tracer signals are binary waveforms so selected that the resultant waveform at the output of the signal voter in normal operation is a square wave.

3. The arrangement of claim 2, in which a source of square wave signals is provided, the frequency of the square wave signal being a multiple of the frequency of the tracer signals, the sources of tracer signals each comprise a group of logic gates that generate the tracer signals responsive to the square wave signal, and the generating means comprises means for comparing the output of the square wave signal source with the output of the signal voter.

4. The arrangement of claim 3, additionally comprising an alarm responsive to a discrepancy between the outputs of the square wave signal source and the voter.

5. The arrangement of claim 3, additionally comprising:
    a plurality of sources of analog signals equal in number to the inputs of the signal voter, the analog signals being concentrated in a frequency band below the frequency of the square wave signal;
    means for coupling the respective analog signal sources to the inputs of the signal voter to combine with the respective tracer signals;
    utilization means for the analog signals;
    a low-pass filter coupling the output of the signal voter to the utilization means, the low-pass filter having a cutoff below the frequency of the square wave signal; and a high-pass filter coupling the output of the signal voter to the generating means, the high-pass filter having a cutoff above the frequency band of the analog signals.

6. The arrangement of claim 3, in which the signal voter has four inputs and the truth table of the signal voter is symmetrical, selecting the second most positive signal for half the combinations of the input signal conditions and the second most negative input signal for half the combinations of the input signal conditions.

7. The arrangement of claim 1, additionally comprising:
a plurality of sources of analog signals equal in number to the inputs of the signal voter, the analog signals being concentrated in a frequency band below the frequencies of the tracer signals;
means for coupling the respective analog signal sources to the inputs of the signal voter to combine with the respective tracer signals;
utilization means for the analog signals;
a low-pass filter coupling the output of the signal voter to the utilization means, the low-pass filter having a cutoff below the frequency of the square wave signal; and
a high-pass filter coupling the output of the signal voter to the generating means, the high-pass filter having a cutoff above the frequency band of the analog signals.

8. The arrangement of claim 1, in which the generating means comprises:
an additional signal voter having a plurality of inputs and a single output, both signal voters transmitting to their outputs the signal applied to one of their inputs, depending upon the relative amplitudes of such input signals in accordance with the same truth table;
means for coupling each source to a different input of the additional signal voter; and
means for comparing the resultant tracer waveforms appearing at the outputs of the signal voters.

9. A self-testing signal selecting arrangement comprising:
a quadvoter having four inputs and a single output, the quadvoter transmitting to the output the signal applied to one of its inputs, depending upon the relative amplitudes of such input signals in accordance with the following truth table

QUAD VOTER TRUTH TABLE

| + | | | | | | | | | | | | | | | | | | | | | | | | |
|---|---|---|---|---|---|---|---|---|---|---|---|---|---|---|---|---|---|---|---|---|---|---|---|---|
| | 1 | 1 | 3 | 3 | 1 | 1 | 2 | 2 | 1 | 1 | 4 | 4 | 3 | 3 | 4 | 4 | 2 | 2 | 4 | 4 | 2 | 2 | 3 | 3 |
| | 3 | 3 | 1 | 1 | 2 | 2 | 1 | 1 | 4 | 4 | 1 | 1 | 4 | 4 | 3 | 3 | 4 | 4 | 2 | 2 | 3 | 3 | 2 | 2 |
| | 2 | 4 | 2 | 4 | 3 | 4 | 3 | 4 | 2 | 3 | 2 | 3 | 1 | 2 | 1 | 2 | 1 | 3 | 1 | 3 | 1 | 4 | 1 | 4 |
| − | 4 | 2 | 4 | 2 | 4 | 3 | 4 | 3 | 3 | 2 | 3 | 2 | 2 | 1 | 2 | 1 | 3 | 1 | 3 | 1 | 4 | 1 | 4 | 1 |

TRACER TRUTH TABLE

| | $A_1$ | $B_1$ | $A_2$ | $B_2$ | $A_3$ | $B_3$ |
|---|---|---|---|---|---|---|
| $T_1$ | 1 | 1 | 1 | 0 | 0 | 0 |
| $T_2$ | 0 | 1 | 0 | 0 | 1 | 1 |
| $T_3$ | 1 | 0 | 0 | 1 | 0 | 1 |
| $T_4$ | 0 | 0 | 1 | 1 | 1 | 0 | where the numbers represent the four different input signals, the individual vertical columns represent the 24 possible different input signal conditions, the input signals are arranged vertically in order of relative amplitude so the topmost number of each vertical column represents the most positive of the four input signals and the bottommost number of each vertical column represents the most negative of the four input signals, and the number inside of the heavy-lined square of each vertical column represents the input signal that is selectively transmitted to the output;
four sources of binary tracer signals that vary differently as a function of time in accordance with one of nine sets of tracer signals constructed from the following truth table where the number "1" designates a positive binary value and the number "0" designates a negative binary value, the horizontal rows $T_1$ through $T_4$ designate the binary values assumed by the different tracer signals, the vertical columns $A_1$, $B_1$, $A_2$, $B_2$, $A_3$, $B_3$, designate the different time intervals that together form a test cycle of the tracer signals, and the nine sets of tracer signals comprise the different positional combinations of columns $A_1$, $A_2$, and $A_3$, and columns $B_1$, $B_2$ and $B_3$;
means for coupling each source to a different input of the quadvoter; and
means for monitoring the output of the quadvoter for a resultant square wave tracer waveform.

10. A testing arrangement for a signal voter having a plurality of inputs and a single output, the voter transmitting to the output the signal applied to one of its inputs, depending upon the relative amplitudes of such input signals, the arrangement comprising:
a plurality of sources of binary tracer signals corresponding to the respective inputs of the signal voter, the tracer signals being selected to form a resultant square wave waveform at the output of the signal voter in normal operation;
means for coupling each source to a different input of the signal voter; and
means for sensing the absence or presence of a square wave tracer waveform at the output of the signal voter.

11. A testing arrangement for two signal voters each having a plurality of inputs and a single output, the voters each transmitting to their output the signal applied to one of their inputs, depending upon the relative amplitudes of such input signals in accordance with the same truth table, the arrangement comprising:
a plurality of sources of alternating current tracer signals that vary differently as a function of time, one source corresponding to each of the plurality of signal voter inputs;
means for coupling the respective sources to the inputs of one of the signal voters;
means for coupling the respective sources to the inputs of the other signal voter; and
means for comparing the resultant tracer waveforms appearing at the outputs of the signal voters.

12. The arrangement of claim 11, additionally comprising:
a plurality of sources of nominally identical analog signals to be selected, one source corresponding to each of the plurality of signal voter inputs;
means for coupling the respective sources of analog signals to the inputs of one of the signal voters for additive combination with a tracer signal;
means for coupling the respective sources of analog signals to the inputs of the other signal voter for additive combination with a tracer signal;
first and second utilization means; and
means for coupling the output of each signal voter to one of the utilization means.

13. The arrangement of claim 12, in which:
the analog signals are concentrated in a frequency band below the frequencies of the tracer signals;
the means for coupling the output of each signal voter to the utilization means comprises low-pass filter means having a cutoff below the frequencies of the tracer signals; and
the comparing means includes high-pass filter means having a cutoff above the frequency band of the analog signals.

14. A self-testing signal selecting arrangement comprising:
first and second signal voters each having a plurality of inputs and a single output, the voters each transmitting to their output the signal applied to one of their inputs, depending upon the relative amplitudes of such input signals in accordance with the same truth table;
a plurality of sources of alternating current tracer signals that vary differently as a function of time, one source of tracer signals corresponding to each input of the signal voters;

a plurality of sources of nominally identical analog signals to be selected, one source of analog signals corresponding to each input of the signal voters, the analog signals being concentrated in a frequency band below the frequencies of the tracer signals;

means for coupling the respective sources of tracer signals and analog signals to the corresponding inputs of the first and second signal voters;

first and second utilization means;

filter means for coupling the selected analog signal at the output of the first signal voter to the first utilization means to the exclusion of the tracer signals;

filter means for coupling the selected analog signal at the output of the second signal voter to the second utilization means to the exclusion of the tracer signals; and means for comparing the resultant tracer waveforms appearing at the outputs of the first and second signal voters.

15. A self-testing signal selecting arrangement comprising:

a signal voter having a plurality of inputs and a single output, the voter transmitting to its output the signal applied to one of its inputs, depending upon the relative amplitudes of such input signals;

a plurality of sources of alternating current tracer signals that vary differently as a function of time, one source of tracer signals corresponding to each input of the signal voter;

a plurality of sources of nominally identical analog signals to be selected, one source of analog signals corresponding to each input of the signal voter, the analog signals being concentrated in a frequency band below the frequencies of the tracer signals;

means for coupling the corresponding sources of tracer signals and analog signals to the respective inputs of the signal voter;

utilization means;

filter means for coupling the selected analog signal at the output of the signal voter to the utilization means to the exclusion of the tracer signals; and means for sensing the resultant tracer waveform appearing at the output of the signal voter.

16. The arrangement of claim 16, in which the sensing means comprises means for detecting the resultant tracer waveform and filter means for coupling the signal representing the resultant tracer waveform at the output of the signal voter to the detecting means to the exclusion of the selected analog signal.

17. A method of testing the operation of a signal voter that selectively transmits to its output one of a plurality of input signals depending upon their relative amplitudes, the method comprising the steps of:

applying to the respective inputs of the signal voter unlike alternating current test signals, the test signals being binary representations generated from a single square wave pulse source, the different test signals being so configured that the resultant signal produced at the output of the signal voter is identical to the square wave pulses when the signal voter is operating normally; and detecting the resultant signal produced at the output of the signal voter by comparing the output of the square wave pulse source with the output of the signal voter.

18. A method of testing the operation of a signal voter that selectively transmits to its output one of a plurality of input signals, depending upon their relative amplitudes, the method comprising the steps of:

applying to the respective inputs of the signal voter unlike alternating current test signals;

applying to the respective inputs of the signal voter in an additive relationship with the test signals analog signals to be selectively transmitted to produce at the output of the signal voter high-frequency components representing the test signals and low-frequency components representing the analog signals;

utilizing the low-frequency components of the resultant signal produced at the output of the signal voter;

detecting the high-frequency components of the resultant signal produced at the output of the signal voter; and indicating the failure of the detected high-frequency components to meet a predetermined standard representative of normal operation of the signal voter.

19. A method of testing the operation of a signal voter that selectively transmits to its output one of a plurality of input signals depending upon their relative amplitudes, there being a given number of input signal conditions, the method comprising the steps of:

applying to the respective inputs of the signal voter unlike binary test signals, that produce at the output of the signal voter under normal operation a predetermined resultant test pattern waveform repeated at periodic intervals, the test signals assuming a number of combinations of binary values during each interval equal to the given number of input signal conditions; and generating an indication upon the absence of the predetermined resultant test pattern at the output of the signal voter.

* * * * *

PO-1050
(5/69)

UNITED STATES PATENT OFFICE
CERTIFICATE OF CORRECTION

Patent No. 3,639,778      Dated February 1, 1972

Inventor(s) Bruce R. Cereghino and Paul M. Rostek

It is certified that error appears in the above-identified patent and that said Letters Patent are hereby corrected as shown below:

Patent column 1, line 67, "pattern" should be deleted.

Patent column 4, line 32, "Combined" should be --combined--.

Patent column 5, line 2, "$r_1$" should be --$T_1$--.

Patent column 9, the "Tracer Truth Table" at line 55 should be inserted between lines 71 and 72.

Patent column 11, line 46, "The arrangement of claim 16" should be --The arrangement of claim 15--.

Signed and sealed this 9th day of January 1973.

(SEAL)
Attest:

EDWARD M. FLETCHER, JR.           ROBERT GOTTSCHALK
Attesting Officer                 Commissioner of Patents